May 26, 1936.  G. I. RHODES  2,041,863
SAFETY SYSTEM FOR PIPE LINES
Filed Nov. 21, 1930
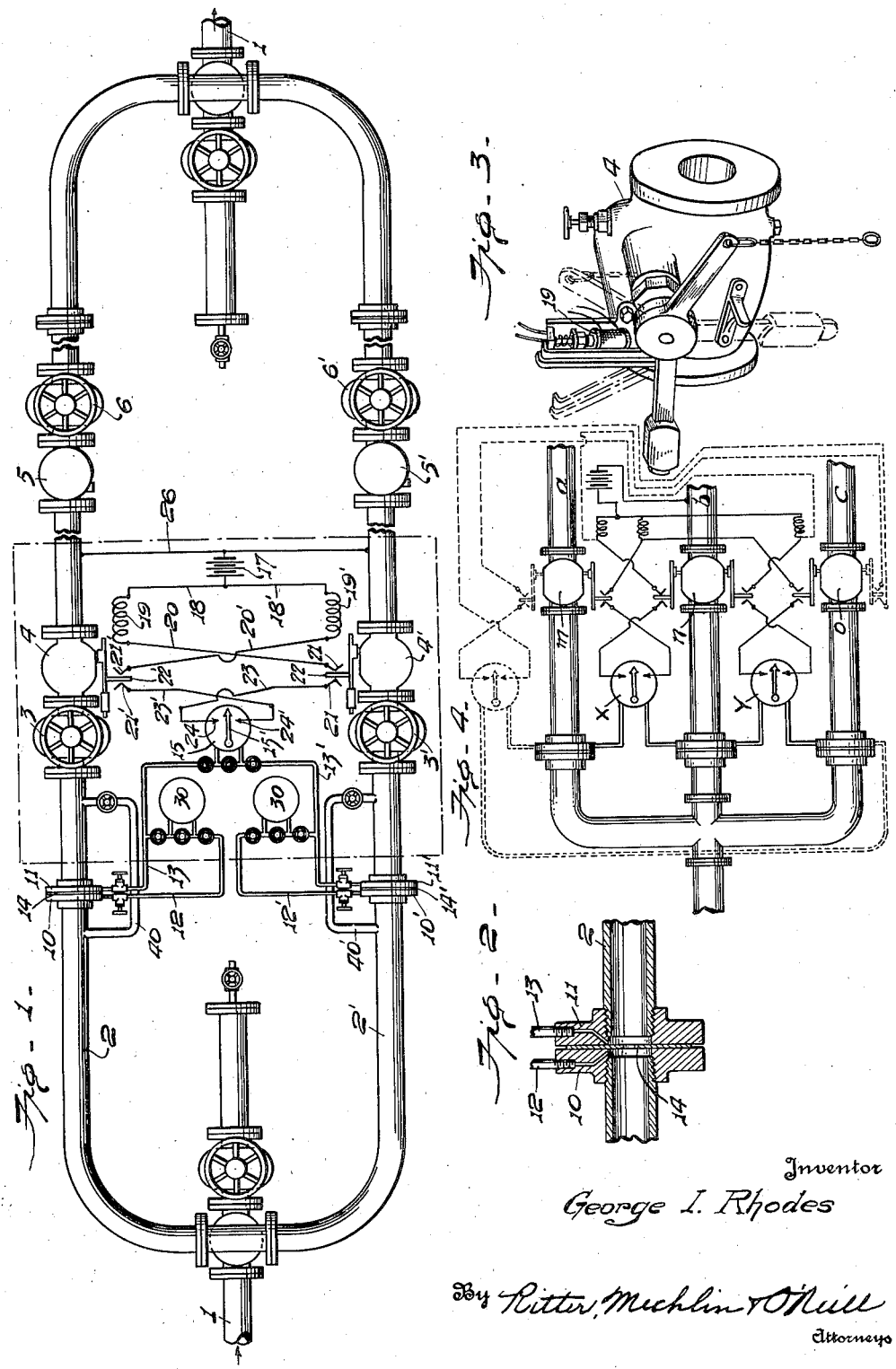
Inventor
George I. Rhodes
By Ritter, Michlin & O'Neill
Attorneys Patented May 26, 1936

2,041,863

UNITED STATES PATENT OFFICE 2,041,863

SAFETY SYSTEM FOR PIPE LINES

George I. Rhodes, Glen Ridge, N. J., assignor, by direct and mesne assignments, of one-half to Ford, Bacon & Davis, Inc., New York, N. Y., a corporation of New Jersey, and one-half to Phillips Petroleum Company, Bartlesville, Okla., a corporation of Delaware Application November 21, 1930, Serial No. 497,299

19 Claims. (Cl. 137—153)

The invention relates to safety systems for pipe lines conveying liquids or gases and has for its object to provide means for stopping the flow to a break or leak in the line, by means of automatic valves at the beginning and at the end of the section of the line in which the break or leak occurs, the operation of the automatic valve at the up-stream end being controlled by differential pressure actuated means, and that at the down-stream end by a similar means, or by a valve operated by reversal of flow, the invention further contemplating a special arrangement of the pipe line and its controlling means at river crossings involving a division of the line into two or more branches, each branch being provided with an automatic valve near the up-stream end and a similar valve or a check valve closing against reverse flow near the down-stream end of the branch, the automatic valves being controlled by means of electric circuits, which, in turn, are controlled by a differential flow meter installed in a cross connection between adjacent branches of the pipe line; whereby a break or a leak producing a decrease in pressure in one of the branches will result in the closure of the automatic valves in that branch and a concurrent interruption of the electric circuits controlling the automatic valves in the other branch, so that the flow in the pipe line will be uninterrupted in the latter branch.

The invention is illllustrated in the accompanying drawing, in which:—

Fig. 1 is a diagrammatic plan view of the system as applied to a river crossing in which the pipe line is divided into two branches with the automatic control of each.

Fig. 2 is a sectional elevation of a standard arrangement of orifice plate and flanges.

Fig. 3 is a perspective view of a suitable automatic emergency stop valve, one of which is interpolated in each branch.

Fig. 4 is a diagrammatic plan view of a system involving three branches.

Referring to the drawing, 1 indicates the main pipe line for conveying natural gas, oil, gasoline or the like and, as stated, the particular exemplary illustration of the invention indicates such a pipe line installed in a river crossing, the line being divided into two branches 2, 2', each branch being fitted with a hand operated gate valve 3, 3' near its up-stream end and with an automatic emergency stop valve 4, 4' preferably adjacent the respective valves 3, 3', said automatic stop valve being of a well known type commonly employed in steam lines and being held normally in open position by means of an electromagnetically released latch, such a valve being illustrated in Fig. 3.

Each branch is provided with an orifice plate indicated at 14, 14' secured between flanges 10 and 11 and 10' and 11', respectively, usually employed in standard flow meter installations, the orifice plate being so designed as to produce a given differential pressure at the entrance to the ducts formed in the flanges, which ducts are connected to the flow meter by pipes 12, 12' and 13, 13'.

In the particular installation, the pipe 13, 13' is cross connected between the flanges 11, 11' on the down-stream side of each plate and has connected therein a standard differential flow meter of the electrical contact making and/or indicating type, conventionally illustrated at 15 and including an indicating element 15', which may be in the form of a pointer adapted to engage and close electric circuits through adjustable contacts 24 and 24', when said indicating element of the meter is deflected due to a slight change in the pressures resulting from a change in the relative rates of flow in the respective branches 2, 2'. Obviously other types of contact making flow meters can readily be adapted to accomplish a like result.

In order to bring the indicating element 15' of the differential flow meter 15 to zero position, resulting from equalization of pressures when the normal flow through the respective branches 2, 2' is unbalanced due to difference in frictional resistance offered by the respective branches or other causes, a valved by-pass 40, 40' is disposed around each of the orifice plates and associated flanges, so that, by regulating the flow through the respective by-passes, the pressures at the respective ends of the pipe 13, 13' connected to the ducts in the flanges 11, 11' may be equalized, under which conditions the indicating element 15' of the differential flow meter 15 will stand at zero.

As stated, each of the automatic stop valves 4, 4' is held in open position by means of a latch, which is released, to permit the valves to close, by means of an electromagnet or solenoid, such as 19, 19', which is energized by current from a storage battery, or from a series of dry cells, or other source of electric energy. Each magnet is included in a separate circuit, the circuit for magnet 19 being from battery 17, lead 18, magnet coil 19, lead 20, through contacts 21, 21 normally closed by a moving part 22 of emergency stop valve 4' when the latter valve is open, lead 23, adjustable contact 24 of the differential flow meter 15, indicating element 15' of said flow meter through the metallic frame of said meter to the pipe line system, thence back to the battery by lead 26 connected to the respective branches of the pipe line. The circuit for magnet 19', which latter controls emergency stop valve 4', is as follows: battery 17, lead 18', magnet coil 19', lead 20', contacts 21', 21' normally closed by a moving part 22' of the emergency stop valve 4, when the latter valve is open, lead 23' to adjustable contact 24' of the differential flow meter 15, thence back to the battery as before. It will be noted that each automatic stop valve controls contacts in the operating circuit of the stop valve in the other branch, so that, when one of the emergency stop valves is closed, the circuit to the other will be interrupted at the contacts 21, 21 or 21', 21' and the corresponding stop valve cannot be automatically released by the coordinated electromagnet. Obviously other types of automatically closing valves can readily be adapted to a like service.

As shown, the down-stream end of each of the pipe line branches 2, 2' is provided with a check valve closing against reverse flow in the pipe line, said check valves being indicated at 5, 5' and each branch is also fitted with a manually operated gate valve 6, 6'.

It will be understood that the various operating elements of the control system are located in suitable housings at or adjacent the ends of the respective multiple pipe line sections.

Should a break or a leak occur in either of the branches of the pipe line, the automatic stop valve in that branch will be closed promptly, shutting off the flow toward the break in the up-stream end of the branch and the check valve, located in the down-stream end of the branch, will be closed by the reversal of the flow in said branch. For purposes of illustration, assume that a break or a leak occurs in the submerged portion of the branch 2 of the pipe line. The effect of such leak will be to increase the flow in said branch and reduce the pressure at the end of the cross connecting pipe 13, which is tapped into the flange 11 adjacent the orifice plate 14 and this reduction in pressure will cause the indicator 15' of the differential flow meter 15 to engage the contact 24 and close the circuit through the magnet or solenoid 19, which controls the automatic stop valve 4, releasing the latch of said valve and permitting the valve to close, thereby stopping the flow in the branch 2. The closure of valve 4 will open the contacts 21', 21', in the tripping circuit of valve 4' and the flow will continue uninterrupted through the branch 2' and the normal service of the pipe line will be maintained. The closure of the up-stream valve in the broken or leaking portion of the section 2 between the emergency stop valve 4 and the check valve 5 will cause the predominant pressure on the down-stream side of the check valve 5 to close the latter promptly, if the leak has been insufficient in itself to cause a reversal of flow, and prevent the fluid in the down-stream portion of the pipe line beyond the check valve from escaping.

Obviously if the orifices 14, 14' are located down-stream from the emergency stop valves 4, 4' the circuit breaking contacts on the stop valves will be unnecessary, since the closure of the stop valve will reduce the pressure on the down-stream side of the orifice instead of increasing it as with the arrangement shown by Fig. 1, but the flow meter instrument would be called upon to withstand the full line pressure between pipes 13 and 13' instead of the differential pressures as in the preferred arrangement described.

Obviously also the emergency stop valves could be closed through the action of contact making differential flow meters connected across the flanges 10 and 11 of orifice 14 and across the flanges 10' and 11' of orifice 14'. The particular arrangement, including the cross connection through the flow meter is preferred, however, because it results in greater sensitiveness. There being no cross differential pressure when there are no leaks, the instrument can be set to operate at a very slight cross differential pressure resulting from a very slight leak in either line. This is of particular importance when handling liquids in long lines when there will be little increased total flow resulting even from a complete rupture of the line and accordingly the flow in a broken line of a pair is practically limited to twice the normal flow. In the case of lines transporting compressed gases or expansible fluids a break even in a single line will result in a greatly increased flow due to expansion of the fluid to meet the reduced pressure.

As heretofore indicated, the frictional resistances to the flow in the branches 2, 2' are likely to be unequal and accordingly there will be an unequal flow of fluid through the branches and, therefore, an initial cross differential pressure, unless means are provided for adjusting the differential pressures. This adjustment is provided by the by-passes 40, 40' around the respective orifice plates and each by-pass is equipped with a plug valve provided with means for locking it in place after the necessary adjustment has been made. By adjusting the by-pass flow around one or the other of the orifices, it will be possible to adjust the differential to exact equality under normal operating conditions, which will be manifested by the pointer or indicating means of the meter 15 coming to rest at its central or zero position, when the line is in operation.

If desired, each branch may be equipped with a standard flow meter, such as 30, 30', which is connected directly with the ducts in the orifice plate flanges 10, 10' and 11, 11' by the pipes 12, 12' and 13, 13'.

Although the exemplary system has been illustrated and described as including check valves, closing against reverse flow, in the down-stream ends of the respective branches, it will be obvious that other types of automatic valves may be substituted for said check valves, when deemed expedient or advisable, in which case a substantial duplicate of the arrangement of the stop valves and automatic control as employed at the up-stream ends of the branches may be installed in the down-stream ends thereof. It will also be understood that any suitable type of automatically closing valve may be substituted for that shown in Fig. 3 and also that the orifice plates may be replaced by Pitot tubes, Venturi tubes or other equivalent differential pressure producing means.

Likewise the control system is well adapted to pipe lines including multiple conduits generally.

While the system has been illustrated as involving two branches of the pipe line installed at a river crossing, it will be apparent that these branches may be multiplied with a corresponding multiplication of the controlling elements including the automatic stop valves, cross connected differential flow meters and electric systems.

When the system involves an even number of branches, the arrangement shown in Fig. 1 is provided for each pair of branches. When, however, an odd number of branches is employed, each including an automatic valve, the circuit arrangement will involve certain changes or additions as illustrated in Fig. 3, in which the differential flow meter $x$ controls the automatic valves $m$, $n$ in branches $a$ and $b$, respectively, and, when either valve $m$ or $n$ is closed, it opens the circuit to the magnet controlling the other valve and the latter cannot be operated automatically by flow meter $x$. Valve $n$, however, is provided also with means for making and breaking the circuit to the magnet controlling valve $o$, and valve $o$ is provided with means for making and breaking the circuit to magnet controlling valve $n$, the contacts of flow meter $y$ being connected to the magnets of valves $n$ and $o$ in the manner shown in Fig. 3, so that if valve $n$ is closed by reason of a break or leak in branch $b$, neither valve $m$ nor valve $o$ can be automatically tripped, as their respective trip circuits will be opened at the two sets of contacts controlled by valve $n$. If it is desired to have valves $m$ and $o$ automatically controlled when valve $n$ is closed, a third contact making differential flow meter $z$ for this purpose can be connected between the down-stream orifices flanged in pipes $a$ and $c$ and additional contacts can be installed on valves $o$ and $m$ connected into the tripping circuits of valves $m$ and $o$ respectively, as shown in dotted lines in Fig. 4. A break in branch $b$ results in a prompt closure of valve $n$ and a similar valve or a check valve in the down-stream end of said section, and similarly, a break in branch $c$ or $a$ effects the closing of valve $o$ or $m$ and similar valves or check valves at the down-stream end of said branch, and in either case the flow is taken by the other two branches.

In its generic aspect, the invention includes what is, in effect, a relay system adapted to bring about the closing of automatic valves at both ends of a section of a multiple branch pipe line in which section a break or even a relatively slight leak occurs, said relay including means utilizing a cross differential pressure between the branches to operate a differential flow meter which in turn controls the closing of the coordinate automatic stop valve or valves.

What I claim is:

1. A pipe line including a feed pipe and a discharge pipe connected together by branch pipes, each branch pipe having means for obtaining differential pressures therein and a cut-off valve, and automatically operating means actuated by differential pressure in the branches for closing a valve in the branch in which pressure falls below that of the other branch.

2. A pipe line having admission and discharge pipes connected together by substantially parallel branch pipes, an electrically controlled valve in each branch pipe, and means functioning due to differential pressures in the branches for closing the valve in the branch in which the pressure falls below that of the other branch.

3. A pipe line having admission and discharge pipes joined together by substantially parallel branch pipes, an orifice plate interposed in each branch pipe, an electrically controlled valve interposed in each branch pipe, a differential meter, tubes connecting the differential meter to the branches at one side of the orifice plates, and electrical means connecting said meter to said valves, whereby when the pressure in one of said branches at the down stream side of the orifice plate of that branch falls below that at the down stream side of the orifice plate of the other branch, the valve in the first mentioned branch will be closed.

4. A pipe line having admission and discharge pipes connected by substantially parallel branches, a normally open valve in each of said branches, a weight for closing each of said valves, electrically actuated means for releasing said weights, and means functioning due to difference in pressure between the two branches for actuating the last mentioned means.

5. A pipe line including admission and discharge pipes connected by substantially parallel branch pipes of similar diameter, a normally open valve in each branch pipe, and means actuated by differential pressures in the branches for closing the valve in either one of the branches when the pressure in the latter varies from that in the other branch.

6. A pipe line having admission and discharge pipes connected by substantially parallel branch pipes, a valve in each of said branch pipes, a weight for closing each of said valves, a trigger for normally holding each valve in open position, a solenoid for actuating each of said triggers, electric circuits in which the solenoids are interposed, and a switch functioning due to differences in pressure in the two branches for completing either one of said circuits and closing the valve in the branch in which the pressure falls below that of the other branch.

7. A pipe line, comprising multiple conduits, an automatic valve in each conduit, differential pressure controlled means operable selectively to stop the flow through the valve in that conduit in which a drop in pressure occurs with reference to the pressure in another of said conduits, and a plurality of pipes forming a cross connection between said means and said conduits to subject said means to pressure from said conduits.

8. A pipe line, comprising multiple conduits, an automatic valve in each conduit, and means for effecting the closing of the valve in that conduit in which a predetermined drop in pressure occurs with respect to the pressure in the others, said means including a differential pressure actuated device, and means for communicating pressure from said conduits to said device to actuate the latter.

9. A pipe line including multiple conduits, spaced automatic valves in each conduit, one of said valves being operative to prevent back flow of the fluid in the conduit, and means operable upon a reduction of pressure in either conduit with respect to the pressure in the other to effect the closure of the automatic valve toward the up-stream end of said conduit in which said reduction in pressure occurs.

10. A pipe line including multiple conduits, an automatic valve in each conduit, means operable upon a reduction of pressure in either conduit with respect to the pressure in the other to effect the closure of the automatic valve in the conduit in which said reduction of pressure occurs, and means operable when said reduction occurs to prevent automatic closing of the valve in the other conduit.

11. A pipe line including multiple conduits, an automatic valve in each conduit and means to effect closure of the automatic valve in a conduit in which occurs a predetermined reduction of pressure with respect to the pressure in the other conduit, said means including a differential pressure actuated device connected to each of said conduits so as to be subject to pressure communicated therefrom, and a plurality of electric circuits controlled by said device.

12. A pipe line including multiple conduits, an automatic valve in each conduit, and differential pressure controlled means to effect closure of the automatic valve in a conduit in which occurs a predetermined reduction of pressure with respect to the pressure in the other conduit, pipes operatively connecting said conduits to said means, and a plurality of means respectively controlled by said valves and each effective on the closing of the valve by which it is controlled to prevent automatic closing of another of said valves.

13. A pipe line including multiple conduits, an automatic valve in each conduit, differential pressure producing means in the coordinate conduits, a cross connection communicating with said conduits adjacent each of said means, a flow meter in said cross connection, and means controlled by said meter for effecting closure of the associated valve in that one of said cross connected conduits in which occurs a decrease in pressure with respect to the pressure in the other.

14. A pipe line including multiple conduits, an automatic valve in each conduit, a differential pressure producing means in each conduit, pipes respectively communicating with said conduits adjacent said differential pressure producing means to cross connect said conduits in pairs, a differential flow meter in each of said cross connections, electric circuits including contacts corresponding to said meters and engageable by the movable elements of the meters, and electromagnets in said circuits controlling the operation of the respective valves.

15. A pipe line including multiple conduits, automatic valves in each conduit, a differential pressure producing means in each conduit, a cross connection between each pair of conduits communicating therewith adjacent said differential pressure producing means, a differential flow meter in each of said cross connections, electric circuits including contacts corresponding to said meters and engageable by the movable elements of the meters, and electromagnets in said circuits controlling the operation of the respective valves, each of said circuits also including contacts closed when the valves controlled by the other circuits are open and opened when said last named valves are closed.

16. A pipe line including a section having branches united at their ends to the main line, an automatic valve in the up-stream end of each branch, a check valve closing against reverse flow in the downstream end of each branch, and means operable upon occurrence of a break or a leak in either branch to effect closure of the automatic valve therein.

17. A pipe line including a section having branches united at their ends to the main line, an automatic valve in the up-stream end of each branch, a check valve closing against reverse flow in the downstream end of each branch, means operable upon occurrence of a break or leak in either branch to effect closure of the automatic valve therein, and means to prevent closing of the automatic valve in one of said branches when the automatic valve in another of said branches is closed.

18. A pipe line including a section having branches united at their ends to the main line, an automatic valve in the up-stream end of each branch, a check valve closing against reverse flow in the downstream end of each branch, and differential pressure controlled means cross connected between said branches to effect closure of the automatic valve in the branch in which a break or a leak occurs.

19. A pipe line including a section having branches united at their ends to the main line, an electrically controlled stop valve in the up-stream end of each branch, a check valve closing against reverse flow in the downstream end of each branch, a differential pressure producing means in each branch, a cross connection between the branches adjacent said means, a differential flow meter in said cross connection, electric circuits including contacts engageable by a movable element of said meter, and electromagnets in said circuits controlling the operation of the respective stop valves.

GEORGE I. RHODES.